United States Patent
Kitago et al.

(10) Patent No.: US 12,197,811 B2
(45) Date of Patent: Jan. 14, 2025

(54) WIRELESS MICROPHONE SYSTEM, RECEIVER, AND VOICE OUTPUT METHOD WITH VARIABLE ASSIGNMENT OF VOICE CHANNELS TO WIRELESS MICROPHONES

(71) Applicant: Panasonic Intellectual Property Management Co., Ltd., Osaka (JP)

(72) Inventors: Ryosuke Kitago, Fukuoka (JP); Takaharu Ninagawa, Fukuoka (JP); Toshiharu Aikawa, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/965,621

(22) Filed: Oct. 13, 2022

(65) Prior Publication Data

US 2023/0385016 A1 Nov. 30, 2023

(30) Foreign Application Priority Data

May 27, 2022 (JP) ................................. 2022-086893

(51) Int. Cl.
*G06F 3/16* (2006.01)
(52) U.S. Cl.
CPC .............. *G06F 3/165* (2013.01); *G06F 3/162* (2013.01)
(58) Field of Classification Search
None
See application file for complete search history.

(56) References Cited

U.S. PATENT DOCUMENTS

| | | | | |
|---|---|---|---|---|
| 8,135,003 B2* | 3/2012 | Axnas | ................... | H04L 1/0001 455/450 |
| 9,979,998 B1* | 5/2018 | Pogue | .............. | H04N 21/43637 |
| 9,992,734 B2* | 6/2018 | Regan | .................. | H04B 1/0003 |
| 2008/0028425 A1* | 1/2008 | Inui | ........................ | H04N 5/602 725/38 |
| 2013/0150114 A1* | 6/2013 | Bodley | ................. | H04M 3/568 455/517 |
| 2014/0112495 A1* | 4/2014 | Bodley | ................... | H04M 3/56 381/80 |

(Continued)

FOREIGN PATENT DOCUMENTS

| JP | 2003061183 A | 2/2003 |
|---|---|---|
| JP | 6982806 B2 | 12/2021 |

*Primary Examiner* — Ariel Mercado-Vargas
(74) *Attorney, Agent, or Firm* — Seed IP Law Group LLP

(57) ABSTRACT

A wireless microphone system includes: an input device; and a receiver including a processor and a memory storing instructions that, when executed by the processor, cause the receive to perform operations. The operations include: wirelessly communicating with at least one of wireless microphones capable of collecting voices of respective speaking persons and wirelessly transmitting voice signals of the respective voices; receiving a voice signal of a speaking person transmitted from a corresponding one of the wireless microphones; holding voice channel management data generated based on input from the input device and defining a use relationship between voice channels and the wireless microphones, respectively; and audibly outputting the voice signal of the speaking person sent from the corresponding one of the wireless microphones by using, based on the voice channel management data, any one of the voice channels.

20 Claims, 9 Drawing Sheets

(56) References Cited

U.S. PATENT DOCUMENTS

2014/0254810 A1* 9/2014 Abramsky ............... H04B 5/06
  381/58
2019/0268683 A1* 8/2019 Miyahara .............. H04J 3/0658
2023/0021659 A1* 1/2023 Hafeez ................ H04W 56/001

* cited by examiner

WIRELESS MICROPHONE SYSTEM, RECEIVER, AND VOICE OUTPUT METHOD WITH VARIABLE ASSIGNMENT OF VOICE CHANNELS TO WIRELESS MICROPHONES

CROSS-REFERENCE TO RELATED APPLICATIONS

This application is based on and claims priority under 35 USC 119 from Japanese Patent Application No. 2022-086893 filed on May 27, 2022, the contents of which are incorporated herein by reference.

TECHNICAL FIELD

The present disclosure relates to a wireless microphone system, a receiver, and a voice output method.

BACKGROUND ART

JP2003-061183A discloses a bi-directional communication system for a conference facility including a plurality of microphone handsets capable of bi-directional wireless communication and a system control unit. In the bi-directional communication system for a conference facility, the system control unit is provided with a speech frame management table and a speech waiting management table. When a speech request signal is output from the microphone handset to the system control unit, the system control unit gives speech permission to the microphone handset and registers the microphone handset in the speech frame management table when a free space is present in the speech frame management table, and registers the microphone handset in the speech waiting management table and causes the microphone handset to wait when no free space is present.

SUMMARY OF INVENTION

In JP2003-061183A, a microphone is assigned to each participant in a conference in a usable manner, and the microphone handsets of the participants are managed by two types of tables, that is, the speech frame management table in which microphone handsets of a certain number of persons that are less than the participants are registered, and the speech waiting management table in which microphone handsets for remaining participants other than the certain number of persons are registered. When the free space is present in the speech frame management table, the microphone handset that is being registered in the speech waiting management table and has issued the speech request signal is newly registered in the speech frame management table. However, in JP2003-061183A, it is not assumed that which of the plurality of microphone handsets uses a plurality of voice channels used in wireless communication between each microphone handset and the system control unit (in other words, which microphone handset is assigned) is freely determined and edited. In particular, in a conference in which a plurality of persons participate, it is often difficult to assume which participant requests the speech at which timing, and, for example, flexibility of opportunity setting of the speech is required so that each participant has an opportunity to make a speech.

The present disclosure has been made in view of the above situations in related art, and an object thereof is to provide a wireless microphone system, a receiver, and a voice output method that flexibly set an opportunity for the participant to make a speech and improve convenience.

The present disclosure provides a wireless microphone system including: an input device; and a receiver including a processor and a memory storing instructions that, when executed by the processor, cause the receive to perform operations, the operations including: wirelessly communicating with at least one of a plurality of wireless microphones, the plurality of wireless microphones capable of collecting voices of respective speaking persons and wirelessly transmitting voice signals of the respective voices; receiving a voice signal of a speaking person transmitted from a corresponding one of the plurality of wireless microphones; holding voice channel management data generated based on input from the input device, the voice channel management data defining a use relationship between a plurality of voice channels and the plurality of wireless microphones, respectively; and audibly outputting the voice signal of the speaking person sent from the corresponding one of the plurality of wireless microphones by using, based on the voice channel management data, any one of the plurality of voice channels.

The present disclosure provides a receiver including: a wireless communication device; a voice output device; a processor; and a memory storing instructions that, when executed by the processor, cause the receiver to perform operation, the operations including: causing the wireless communication device to wirelessly communicate with at least one of a plurality of wireless microphones, the plurality of wireless microphones capable of collecting voices of respective speaking persons and wirelessly transmitting voice signals of the respective voices; causing the voice output device to audibly output a voice signal of a speaking person received from a corresponding one of the plurality of wireless microphones by using any one of a plurality of voice channels; and holding voice channel management data generated based on input from an input device, the voice channel management data defining a use relationship between the plurality of voice channels and the plurality of wireless microphones, respectively; and controlling, based on the voice channel management data, voice output of the voice signal of the speaking person sent from the corresponding one of the plurality of wireless microphones.

The present disclosure provides a voice output method performed by a wireless microphone system, the wireless microphone system including at least an input device and a receiver, the voice output method including: wirelessly communicating with at least one of a plurality of wireless microphones, the plurality of wireless microphones being capable of collecting voices of respective speaking persons and wirelessly transmitting voice signals of the respective voices; holding voice channel management data generated based on input from the input device, the voice channel management data defining a use relationship between a plurality of voice channels and the plurality of wireless microphones, respectively; receiving a voice signal of a speaking person transmitted from a corresponding one of the plurality of wireless microphones; and audibly outputting the voice signal of the speaking person transmitted from the corresponding one of the plurality of wireless microphones by using, based on the voice channel management data, any one of the plurality of voice channels.

These comprehensive or specific aspects may be implemented by a system, a device, a method, an integrated circuit, a computer program, or a recording medium, or may be implemented by any combination of the system, the device, the method, the integrated circuit, the computer program, and the recording medium.

According to the present disclosure, it is possible to flexibly set an opportunity for a participant to make a speech and improve convenience.

DESCRIPTION OF EMBODIMENTS

Hereinafter, an embodiment in which a wireless microphone system, a receiver, and a voice output method according to the present disclosure are specifically disclosed will be described in detail with reference to the drawings as appropriate. However, unnecessarily detailed descriptions may be omitted. For example, detailed descriptions of well-known matters and redundant descriptions of substantially the same configurations may be omitted. This is to avoid unnecessary redundancy in the following description and to facilitate understanding for those skilled in the art. The accompanying drawings and the following description are provided for those skilled in the art to fully understand the present disclosure, and are not intended to limit the claimed subject matter of the claims.

<System Configuration>

Figure 1:
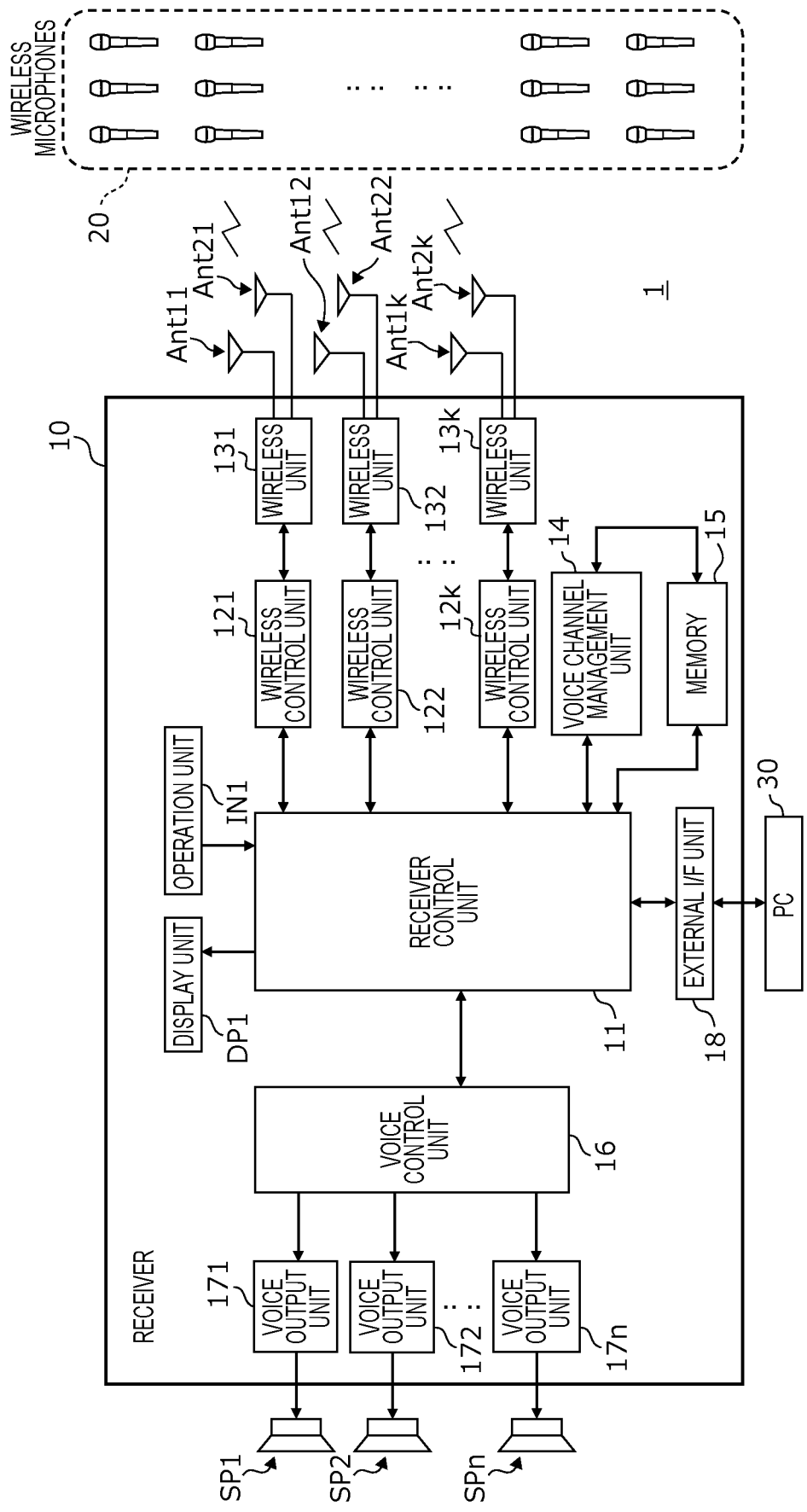
FIG. 1 is a block diagram illustrating an example of a system configuration of a wireless microphone system and an example of a hardware configuration of a receiver.

First, an example of a system configuration of a wireless microphone system and an example of a hardware configuration of a receiver according to the present embodiment will be described with reference to FIG. 1. FIG. 1 is a block diagram illustrating an example of a system configuration of a wireless microphone system 1 and an example of a hardware configuration of a receiver 10. The following embodiment (present embodiment) describes that the wireless microphone system 1 is used, for example, during a conference in which a plurality of employees participate as participants in a conference room or the like of a company, but a use case of the wireless microphone system 1 is not limited to the conference.

The wireless microphone system 1 includes the receiver 10, a plurality of wireless microphones 20, and a PC 30. A configuration example of each of the receiver 10, the wireless microphones 20, and the PC 30 will be described in detail later. The receiver 10 and each of the plurality of wireless microphones 20 perform wireless communication with each other after establishing wireless connection according to a wireless communication standard to be described later. The receiver 10 and the PC 30 can perform data communication by wired connection, and are connected in a wired manner via, for example, a local area network (LAN) cable or a universal serial bus (USB) cable. The receiver 10 and the PC 30 may wirelessly communicate with each other after being wirelessly connected to each other in the same manner as between the receiver 10 and each of the plurality of wireless microphones 20.

The receiver 10 functions as a base unit for the wireless communication with one or more wireless microphones 20 that function as microphone handsets, and is disposed at a predetermined position of a meeting place such as a conference room where a conference is held. Between the receiver 10 and each of the plurality of wireless microphones 20, a wireless signal (for example, a voice signal or a control signal) is transmitted and received through a wireless line conforming to a wireless communication standard of a time division multiple access method (for example, a time division multiplex communication method). When a user of the wireless microphone 20 inputs a voice (for example, speaks) to the wireless microphone 20, a voice signal collected by the wireless microphone 20 is transmitted to the receiver 10 through the wireless line. Here, as the wireless communication standard of the time division multiplex communication method, for example, a digital enhanced cordless telecommunication (DECT) method of a frequency band of 1.9 GHz, which is a standard of a digital cordless telephone developed in 2011, will be described. However, it is needless to say that the wireless communication standard of the time division multiplex communication method is not limited to the DECT.

Here, frequency bands of carriers used in DECT communication will be briefly described.

The DECT wireless communication uses a total of six frequency bands in a 1.9 GHz band (specifically, 1895.616 MHz to 1904.256 MHz). The six frequency bands are a carrier (carrier wave; the same applies hereinafter) having a center frequency of 1895.616 MHz, a carrier having a center frequency of 1897.344 MHz, a carrier having a center frequency of 1899.072 MHz, a carrier having a center frequency of 1900.800 MHz, a carrier having a center frequency of 1902.528 MHz, and a carrier having a center frequency of 1904.256 MHz. These frequency bands are described in detail in FIG. 2 of JP6982806B2, for example.

Since these frequency bands do not overlap each other, interference of radio waves is less likely to occur, and a failure of the wireless communication is less likely to occur. Since the DECT communication using the 1.9 GHz band does not interfere with a radio wave emitted by a device such as a wireless LAN or a microwave oven, a quality of the voice signal in the wireless microphone system 1 can be maintained. The receiver 10 and the wireless microphone 20 constantly or periodically monitor a use state of each frequency band (for example, availability of a resource such as a carrier or a slot) for each frame period of the DECT communication, and can efficiently use the frequency bands of the 1.9 GHz band by selecting an optimal frequency band. According to a standard specification of the DECT communication, the receiver 10 can simultaneously perform wireless communication with each of the plurality of wireless microphones 20 by combining time division multiplex access (TDMA) and frequency division multiplex access (FDMA). Since a slot is described in detail in FIG. 3 of JP6982806B2 described above, a description of the slot will be omitted here.

The receiver 10 performs the wireless communication with each of the plurality of wireless microphones 20. As illustrated in FIG. 1, the receiver 10 includes a receiver control unit 11, k (k is a predetermined integer of 1 or more) wireless control units, k wireless units, k first transmission and reception antennas, k second transmission and reception antennas, a voice channel management unit 14, a memory 15, a voice control unit 16, n (n is a predetermined integer of 2 or more) voice output units, and n speakers. The receiver 10 may further include a display unit DP1 and an operation unit IN1.

The receiver control unit 11 includes a semiconductor chip on which at least one of electronic devices such as a central processing unit (CPU), a digital signal processor (DSP), a graphical processing unit (GPU), and a field programmable gate array (FPGA) is mounted. The receiver control unit 11 functions as a controller that controls overall operations of the receiver 10, and performs control processing of controlling an operation timing and the like of each part of the receiver 10, data input and output processing with the each part of the receiver 10, data arithmetic processing, and data storage processing. The receiver control unit 11 implements execution of various processing by using a program and control data stored in a read only memory (ROM) of the memory 15. The receiver control unit 11 uses a random access memory (RAM) of the memory 15 during an operation, and temporarily stores data or information generated or acquired by the receiver control unit 11 in the RAM of the memory 15.

k (k is the predetermined integer of 1 or more) wireless control units are wireless control units 121, 122, . . . , 12k in FIG. 1. The wireless control units 121 to 12k control establishment and release of the wireless connection with the wireless microphones 20 based on an operation clock from the receiver control unit 11, and instruct the wireless unit to transmit a carrier and a slot designated by the receiver control unit 11. The wireless control units 121 to 12k control wireless units 131 to 13k to perform the wireless communication with the wireless microphones 20 associated with the designated carrier and slot. The wireless control units 121 to 12k acquire, from the wireless units, the voice signals received from the wireless microphones 20 and temporarily store the voice signals in the memory 15.

The k wireless units are the wireless units 131, 132, . . . , 13k in FIG. 1. Each of the wireless units 131 to 13k generates a control signal for controlling synchronization of the wireless microphone system 1 and periodically transmits the control signal to the wireless microphone 20, or receives a control signal for the wireless connection periodically sent from each of the plurality of wireless microphones 20. Each of the wireless units 131 to 13k performs various reception processing such as demodulation when receiving the voice signal having the frequency in the 1.9 GHz band received from each of the plurality of wireless microphones 20, and sends the voice signal to the corresponding wireless control unit.

In FIG. 1, the k first transmission and reception antennas are the transmission and reception antennas Ant11, Ant12, . . . , Ant1k. Each of the transmission and reception antennas Ant11 to Ant1k is connected to the corresponding wireless unit. The wireless unit 131 corresponds to the transmission and reception antenna Ant11, the wireless unit 132 corresponds to the transmission and reception antenna Ant12, and similarly, the wireless unit 13k corresponds to the transmission and reception antenna Ant1k. Each of the transmission and reception antennas Ant11 to Ant1k transmits (emits) a transmission signal (radio wave) from the corresponding wireless unit, and receives the voice signal transmitted from each of the plurality of wireless microphones 20 and sends the voice signal to the corresponding wireless unit.

In FIG. 1, the k second transmission and reception antennas, transmission and reception antennas Ant21, Ant22, . . . , Ant2k are disposed in a manner of being slightly displaced from the transmission and reception antennas Ant11 to Ant1k. Each of the transmission and reception antennas Ant21 to Ant2k is connected to the corresponding wireless unit. The wireless unit 131 corresponds to the transmission and reception antenna Ant21, the wireless unit 132 corresponds to the transmission and reception antenna Ant22, and similarly, the wireless unit 13k corresponds to the transmission and reception antenna Ant2k. A reason why the transmission and reception antennas Ant21 to Ant2k are disposed in a manner of being slightly displaced from the transmission and reception antennas Ant11 to Ant1k is that better wireless communication can be performed by providing a plurality of antennas whose positions are slightly changed in order to prevent an influence of fading (fluctuation of a wireless signal).

The voice channel management unit 14 reads, from the memory 15, a voice channel matrix MTX1 (see FIG. 4) that is generated based on an input from the PC 30 and defines use relationships between a plurality of voice channels (see below) and each of the plurality of wireless microphones 20, and holds the voice channel matrix MTX1. The voice channel management unit 14 specifies (selects) the voice channel corresponding to a microphone number of the wireless microphone 20 based on the voice channel matrix MTX1, and controls via which voice channel the voice signal received from the wireless microphone is audibly output. For example, the voice channel management unit 14 selects the voice channel for voice output of the voice signal received from the wireless microphone 20, and sends an instruction of the voice output via the voice channel corresponding to identification information (for example, a voice channel number) of the selected voice channel to the voice control unit 16. The instruction includes the identification information. Details of the voice channel matrix MTX1 will be described later with reference to FIG. 4.

The memory 15 includes at least the ROM that stores, for example, the program defining the various processing performed by the receiver control unit 11 and the control data used during the execution of the program, and the RAM as a work memory used when the various processing performed by the receiver control unit 11 is executed. The program defining the various processing performed by the receiver control unit 11 and the control data used during the execution of the program are written in the ROM. The data or information (for example, the voice signal received from each of the wireless microphones 20) generated or acquired by the receiver control unit 11 is temporarily stored in the RAM. The data or information stored in the RAM is not limited thereto.

In response to the instruction (see above) from the voice channel management unit 14, the voice control unit 16 outputs the voice signal stored in the memory 15 to the voice output unit equivalent to the voice channel corresponding to the microphone number of the wireless microphones 20 that is a transmission source of the voice signal. Here, the voice channel indicates an output system of a voice signal, and specifically, includes a pair of one voice output unit and a speaker corresponding to the voice output unit. Therefore, the receiver 10 according to the present embodiment has a total of n voice channels.

In FIG. 1, n (n is the predetermined integer of 1 or more) voice output units are voice output units 171, 172, ..., 17n, and speakers SP1, SP2, ..., and SPn. Each of the voice output units 171 to 17n is connected to the corresponding speaker. The voice output unit 171 corresponds to the speaker SP1, the voice output unit 172 corresponds to the speaker SP2, and similarly, the voice output unit 17n corresponds to the speaker SPn. Each of the voice output units 171 to 17n acquires the voice signal stored in the memory 15 via the receiver control unit 11, and audibly outputs the voice signal via the corresponding speaker.

In FIG. 1, then speakers are the speakers SP1, SP2, ..., SPn. Each of the speakers SP1 to SPn audibly outputs the voice signal from the corresponding voice output unit.

An external interface unit 18 is a network interface circuit that performs wired or wireless communication between the receiver 10 and the PC 30. As described above, in the case of the wired connection, the receiver 10 and the PC 30 are connected by a LAN cable or a USB cable. On the other hand, in the case of the wireless connection, the receiver 10 and the PC 30 are connected by, for example, a wireless local area network (LAN) such as Wi-Fi (registered trademark), or near field communication (for example, Bluetooth (registered trademark)).

The display unit DP1 is a display device using, for example, a liquid crystal display (LCD) or an organic electroluminescence (EL), and displays various contents set by the operation unit IN1. The display unit DP1 may be a light emitting element using a light emission diode (LED), and indicates various states such as a reception level during the wireless communication, a voice level, registration of the wireless microphones 20 or a battery remaining amount by lighting or blinking.

The operation unit IN1 is an operation device as a user interface, and includes, for example, a volume knob, a power switch, and a registration button pressed when the wireless microphone 20 is registered.

Figure 2:
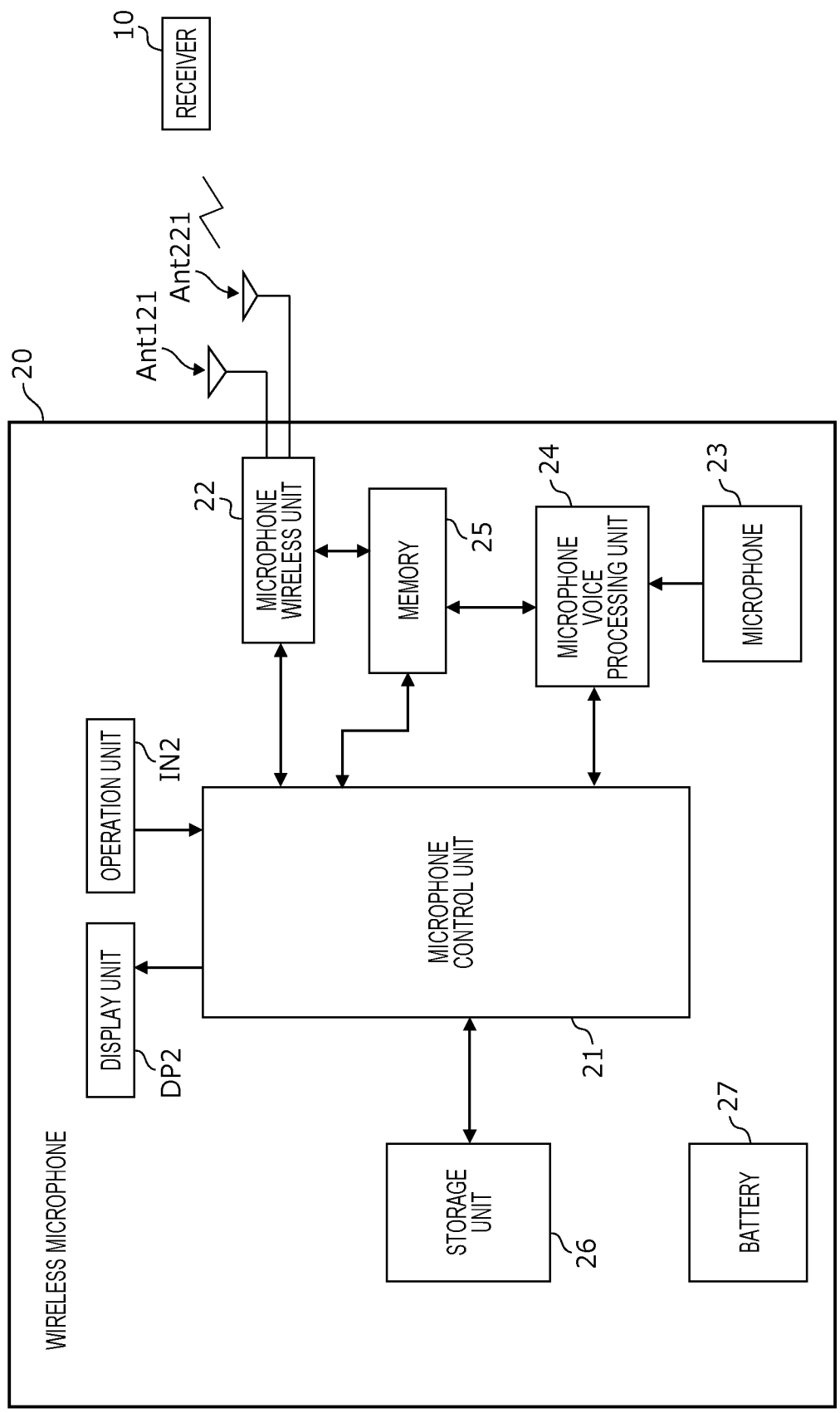
FIG. 2 is a block diagram illustrating an example of a hardware configuration of a wireless microphone.

Next, an example of a hardware configuration of a wireless microphone according to the present embodiment will be described with reference to FIG. 2. FIG. 2 is a block diagram illustrating an example of a hardware configuration of the wireless microphone 20. In FIG. 1, the wireless microphone 20 is illustrated as a handheld microphone, but the wireless microphone 20 is not limited to the handheld microphone, and may be, for example, a gooseneck microphone, a boundary microphone, or another microphone.

The wireless microphone 20 is capable of collecting a voice when a speaking person (for example, a participant of a conference) speaks, and performs the wireless communication of the voice signal of the collected voice with the receiver 10 in accordance with the wireless communication standard such as DECT (see above).

As illustrated in FIG. 2, the wireless microphone 20 includes a microphone control unit 21, a microphone wireless unit 22, a transmission and reception antenna Ant121, a transmission and reception antenna Ant221, a microphone 23, a microphone voice processing unit 24, a memory 25, a storage unit 26, and a battery 27. The wireless microphone 20 may further include a display unit DP2 and an operation unit IN2.

The microphone control unit 21 includes a semiconductor chip on which at least one of electronic devices such as a CPU, a DSP, and an FPGA is mounted. The microphone control unit 21 functions as a controller that controls overall operations of the wireless microphone 20, and performs control processing of controlling an operation timing and the like of each part of the wireless microphones 20, data input and output processing with the each part of the wireless microphones 20, data arithmetic processing, and data storage processing. The microphone control unit 21 implements execution of various processing by using programs and control data stored in a ROM of the memory 25. The microphone control unit 21 uses a RAM of the memory 25 during the operation, and temporarily stores data or information generated or acquired by the microphone control unit 21 in the RAM of the memory 25.

The microphone wireless unit 22 periodically generates the control signal for the wireless connection and sends the control signal to the receiver 10 via the transmission and reception antenna Ant121. The microphone wireless unit 22 converts, into a wireless signal in the 1.9 GHz band, the voice signal collected by the microphone 23 and subjected to voice signal processing by the microphone voice processing unit 24, and sends the wireless signal to the receiver 10 via the transmission and reception antenna Ant121. The subsequent microphone wireless unit 22 performs various reception processing such as demodulation when receiving, via the transmission and reception antenna Ant221, various signals (for example, see FIGS. 5, 6, 7, and 9) having the frequency in the 1.9 GHz band transmitted from the receiver 10, and sends the signals to the microphone control unit 21.

The transmission and reception antenna Ant121 transmits (emits) a transmission signal (radio wave) from the microphone wireless unit 22, receives the various signals (for example, see FIGS. 5, 6, 7, and 9) transmitted from the receiver 10, and sends the signals to the microphone wireless unit 22.

The transmission and reception antenna Ant221 is disposed in a manner of slightly displaced from the transmission and reception antenna Ant121. A reason why the transmission and reception antenna Ant221 is disposed in a manner of being slightly displaced from the transmission and reception antenna Ant121 is that better wireless communication can be performed by providing a plurality of antennas whose positions are slightly changed in order to prevent an influence of fading (fluctuation of a wireless signal).

The microphone 23 collects the voice uttered by the speaking person (for example, the participant of the conference) present in the vicinity of the wireless microphone 20, and sends a signal (voice signal) of the collected voice to the microphone voice processing unit 24.

The microphone voice processing unit 24 performs various types of known voice signal processing on the voice signal collected by the microphone 23, and temporarily stores the voice signal in the memory 25 or sends the voice signal to the microphone control unit 21.

The memory 25 includes at least the ROM that stores, for example, the program defining the various processing performed by the microphone control unit 21 and the control data used during the execution of the program, and the RAM as a work memory used when the various processing performed by the microphone control unit 21 is executed. The program defining the various processing performed by the microphone control unit 21 and the control data used during the execution of the program are written in the ROM. Data or information (for example, the voice signal of the speaking person collected by the microphone 23) generated or acquired by the microphone control unit 21 is temporarily stored in the RAM. The data or information stored in the RAM is not limited thereto.

The storage unit 26 is, for example, a flash memory, and stores the data or information (for example, the voice signal of the speaking person collected by the microphone 23) generated or acquired by the microphone control unit 21.

The battery 27 is, for example, a secondary battery, and supplies necessary power to each part of the wireless microphone 20. For example, when the wireless microphone 20 is electrically connected to an external commercial power supply, the battery 27 may be charged by receiving power supplied from the external commercial power supply.

The display unit DP2 is, for example, a display device using an LCD or an organic EL, and displays various contents set by the operation unit IN2 or a notification content from the receiver 10 (for example, the microphone number of the wireless microphone 20 or the voice channel number of the voice channel in use).

The operation unit IN2 is an operation device as a user interface, and includes, for example, a registration button pressed when the wireless microphone 20 is registered in the receiver 10, a volume knob, and a power switch.

Figure 3:
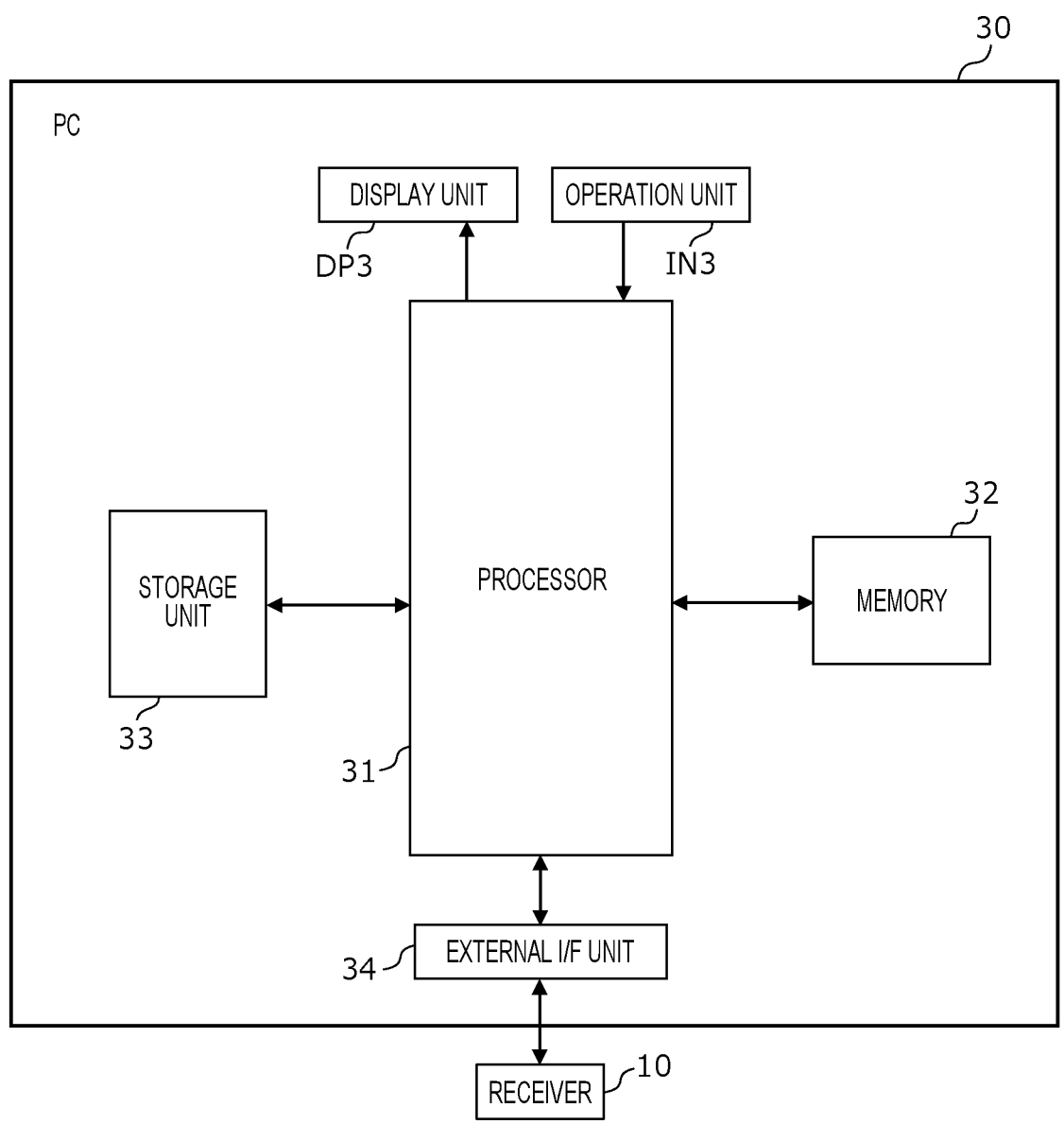
FIG. 3 is a block diagram illustrating an example of a hardware configuration of a PC.

Next, an example of a hardware configuration of a PC according to the present embodiment will be described with reference to FIG. 3. FIG. 3 is a block diagram illustrating the example of the hardware configuration of the PC. Although the PC 30 is illustrated as an example of an external input device constituting the wireless microphone system 1 according to the present embodiment, a smartphone or a tablet terminal may be used instead of the PC 30.

The PC 30 is installed with bundle software (not shown) for generating the voice channel matrix MTX1 by the PC 30 alone or in cooperation with the receiver 10 such that the bundle software can be executed, and generates and stores the voice channel matrix MTX1 or sends the voice channel matrix MTX1 to the receiver 10 based on an operation of an operator (administrator) of the wireless microphone system 1.

As illustrated in FIG. 3, the PC 30 includes a processor 31, a memory 32, a storage unit 33, and an external interface unit 34. The PC 30 may further include a display unit DP3 and an operation unit IN3.

The processor 31 includes a semiconductor chip on which at least one of electronic devices such as a CPU, a DSP, and an FPGA is mounted. The processor 31 functions as a controller that controls overall operations of the PC 30, and performs control processing of controlling an operation timing and the like of each part of the PC 30, data input and output processing with the each part of the PC 30, data arithmetic processing, and data storage processing. The processor 31 implements execution of various processing by using programs and control data stored in a ROM of the memory 32. The processor 31 uses a RAM of the memory 32 during the operation, and temporarily stores data or information generated or acquired by the processor 31 in the RAM of the memory 32. The processor 31 activates the above-described bundle software in response to a signal from the operation unit IN3 based on, for example, the operation of the operator (administrator) of the wireless microphone system 1, creates the voice channel matrix MTX1 by the bundle software alone or through mutual data communication with the receiver 10, and stores the voice channel matrix MTX1 in the memory 32 or the storage unit 33.

The memory 32 includes at least the ROM that stores, for example, the program defining the various processing performed by the processor 31 and the control data used during the execution of the program, and the RAM as a work memory used when the various processing performed by the processor 31 is executed. The program defining the various processing performed by the processor 31 and the control data used during the execution of the program are written in the ROM. Data or information (for example, the voice channel matrix MTX1 or the like) generated or acquired by the processor 31 is temporarily stored in the RAM. The data or information stored in the RAM is not limited thereto.

The storage unit 33 is, for example, a flash memory, and stores the data or information (for example, the voice channel matrix MTX1) generated or acquired by the processor 31.

The external interface unit 34 is a network interface circuit that performs wired or wireless communication between the PC 30 and the receiver 10. As described above, in the case of the wired connection, the receiver 10 and the PC 30 are connected by a LAN cable or a USB cable. On the other hand, in the case of the wireless connection, the receiver 10 and the PC 30 are connected by, for example, a wireless local area network (LAN) such as Wi-Fi (registered trademark), or near field communication (for example, Bluetooth (registered trademark)).

The display unit DP3 is, for example, a display device using an LCD or an organic EL, and displays various screens (for example, an application screen (for example, a generation screen of the voice channel matrix MTX1) while the processor 31 is activating the bundle software (see above)).

The operation unit IN3 is an operation device as a user interface, and includes, for example, a keyboard, a mouse, a touch pad, and a touch panel.

Figure 4:
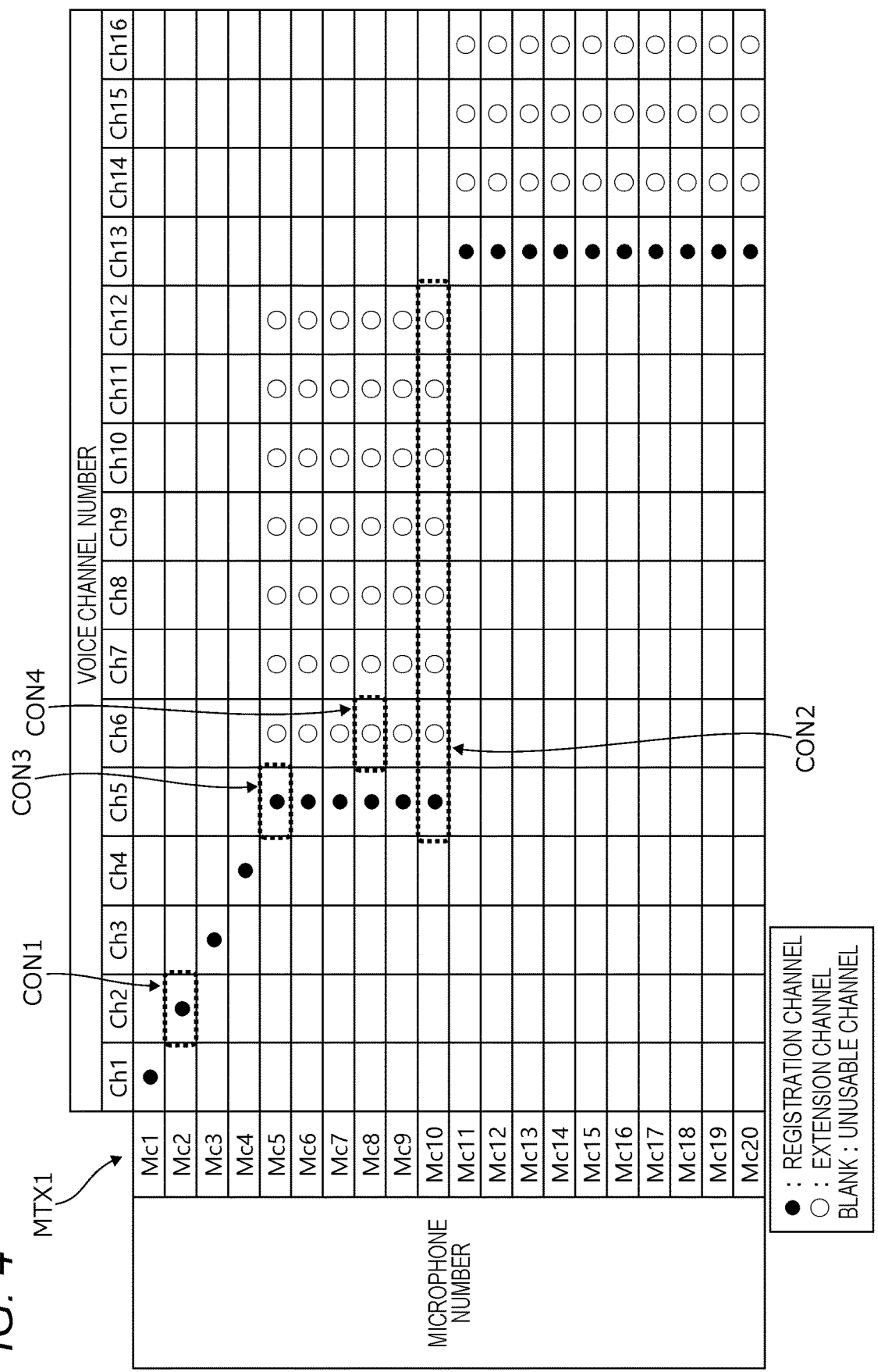
FIG. 4 is a diagram illustrating an example of a voice channel matrix.

FIG. 4 is a diagram illustrating an example of the voice channel matrix MTX1. The voice channel matrix MTX1 is generated by the PC 30 alone, or is generated based on the mutual data communication between the PC 30 and the receiver 10. The voice channel matrix MTX1 is a table that defines the use relationships between n voice channels (specifically, a pair of the voice output unit 171 and the speaker SP1, a pair of the voice output unit 172 and the speaker SP2, . . . , and a pair of the voice output unit 17$n$ and the speaker SPn) and each of the plurality of wireless microphones 20. In the example of FIG. 4, n=16, and the number of wireless microphones 20 is 20, but the respective values are merely examples and are not limited to those values. In FIG. 4, the microphone number is identification information of each of the wireless microphones 20, and specifically, Mc1, Mc2, Mc3, Mc4, Mc5, Mc6, Mc7, Mc8, Mc9, Mc10, Mc11, Mc12, Mc13, Mc14, Mc15, Mc16, Mc17, Mc18, Mc19, and Mc20. Similarly, the voice channel number is the identification information of each of the voice channels, and specifically, Ch1, Ch2, Ch3, Ch4, Ch5, Ch6, Ch7, Ch8, Ch9, Ch10, Ch11, Ch12, Ch13, Ch14, Ch15, and Ch16.

When a symbol "●" or a symbol "○" is given to each of the microphone numbers, the use relationship indicates that the voice signal collected by the wireless microphone 20 of the microphone number can exclusively or selectively use the voice channel number to which the symbol is given.

The symbol "●" indicates a registration channel. The registration channel is a voice channel inevitably specified for one microphone number. Therefore, the voice channel of the voice channel number Ch1 is registered as a registration channel for the microphone number Mc1, the voice channel of the voice channel number Ch2 is registered as a registration channel for the microphone number Mc2, the voice channel of the voice channel number Ch3 is registered as a registration channel for the microphone number Mc3, and the voice channel of the voice channel number Ch4 is registered as a registration channel for the microphone number Mc4. The voice channel of the voice channel number Ch5 is registered as a registration channel for the microphone numbers Mc5 to Mc10, and the voice channel of the voice channel number Ch13 is registered as a registration channel for the microphone numbers Mc11 to Mc20.

The symbol "○" indicates an extension channel. The extension channel is a voice channel that is alternatively or additionally designated for one microphone number in addition to the registration channel. That is, in a case where the registration channel is in use and the voice channel that is the registration channel cannot be used, if the extension channel is registered, the extension channel can be used unless the extension channel is in use. Therefore, the voice channels of the voice channel numbers Ch6 to Ch12 are registered as extension channels for the microphone numbers Mc5 to Mc10, and the voice channels of the voice channel numbers Ch13 to Ch16 are registered as extension channels for the microphone numbers Mc11 to Mc20.

In the voice channel matrix MTX1, in the case where a cell corresponding to the microphone number and the voice channel number is blank, the case indicates that the voice channel corresponding to the cell cannot be used for the output of the voice signal from the wireless microphone 20 of the microphone number.

For example, in a state CON1, the voice channel number Ch2 is exclusively assigned to the microphone number Mc2 as the registration channel. That is, the receiver 10 audibly outputs, via the voice channel (specifically, the voice output unit 172 and the speaker SP2) corresponding to the voice channel number Ch2, the voice signal sent from the wireless microphone 20 of the microphone number Mc2. Therefore, the receiver 10 cannot audibly output the voice signal sent from the wireless microphone 20 of a microphone number other than the microphone number Mc2 from the voice channel corresponding to the voice channel number Ch2. Although a detailed description is omitted, the same applies to the use relationship between the microphone number Mc1 and the voice channel number Ch1, the use relationship between the microphone number Mc3 and the voice channel number Ch3, and the use relationship between the microphone number Mc4 and the voice channel number Ch4.

The voice channel number Ch5 is exclusively assigned to the microphone numbers Mc5 to Mc10 as the registration channel, and the voice channel numbers Ch6 to Ch12 are supplementarily assigned to the microphone numbers Mc5 to Mc10 as the extension channels (for example, see a state CON2). Therefore, when the voice signal from any one of the wireless microphones 20 of the microphone numbers Mc5 to Mc9 is not being audibly output, the receiver 10 can audibly output, via the voice channel corresponding to the voice channel number Ch5, the voice signal from the wireless microphone 20 of the microphone number Mc10, for example. However, when the voice signal from the wireless microphone of any one of the microphone numbers Mc5 to Mc9 (for example, the microphone number Mc5) is being audibly output via the voice channel corresponding to the voice channel number Ch5 (see a state CON3), the receiver 10 can audibly output the voice signal from the wireless microphone 20 of another microphone number (for example, the microphone number Mc8) via the voice channel corresponding to the voice channel number (for example, the voice channel number Ch6) of the smaller number among the unused extension channels (see a state CON4).

The receiver 10 may have two types of operation modes (for example, a normal mode and a conference mode), and may switch the operation mode from the normal mode to the conference mode when predetermined conditions are satisfied. Here, the predetermined conditions correspond to, for example, a condition that a request for setting the operation mode to the conference mode is received from the PC 30, a predetermined time period (for example, 15 minutes from 30 minutes before the conference to 15 minutes before the conference which is set in advance), and a time when the wireless microphone 20 to be used in the conference or the like is newly registered (see FIG. 5), but the predetermined conditions are not limited to thereto. The normal mode is an operation mode in which only one voice channel number can be assigned to one microphone number in the voice channel matrix MTX1 of FIG. 4. On the other hand, as illustrated in the voice channel matrix MTX1 of FIG. 4, the conference mode is an operation mode in which one registration channel and a plurality of extension channels can be registered for one microphone number. In the conference mode, only one registration channel may be registered for one microphone number. When the predetermined conditions described above are not satisfied, the receiver 10 may switch the operation mode from the conference mode to the normal mode.

<System Operation Procedure>

Figure 5:
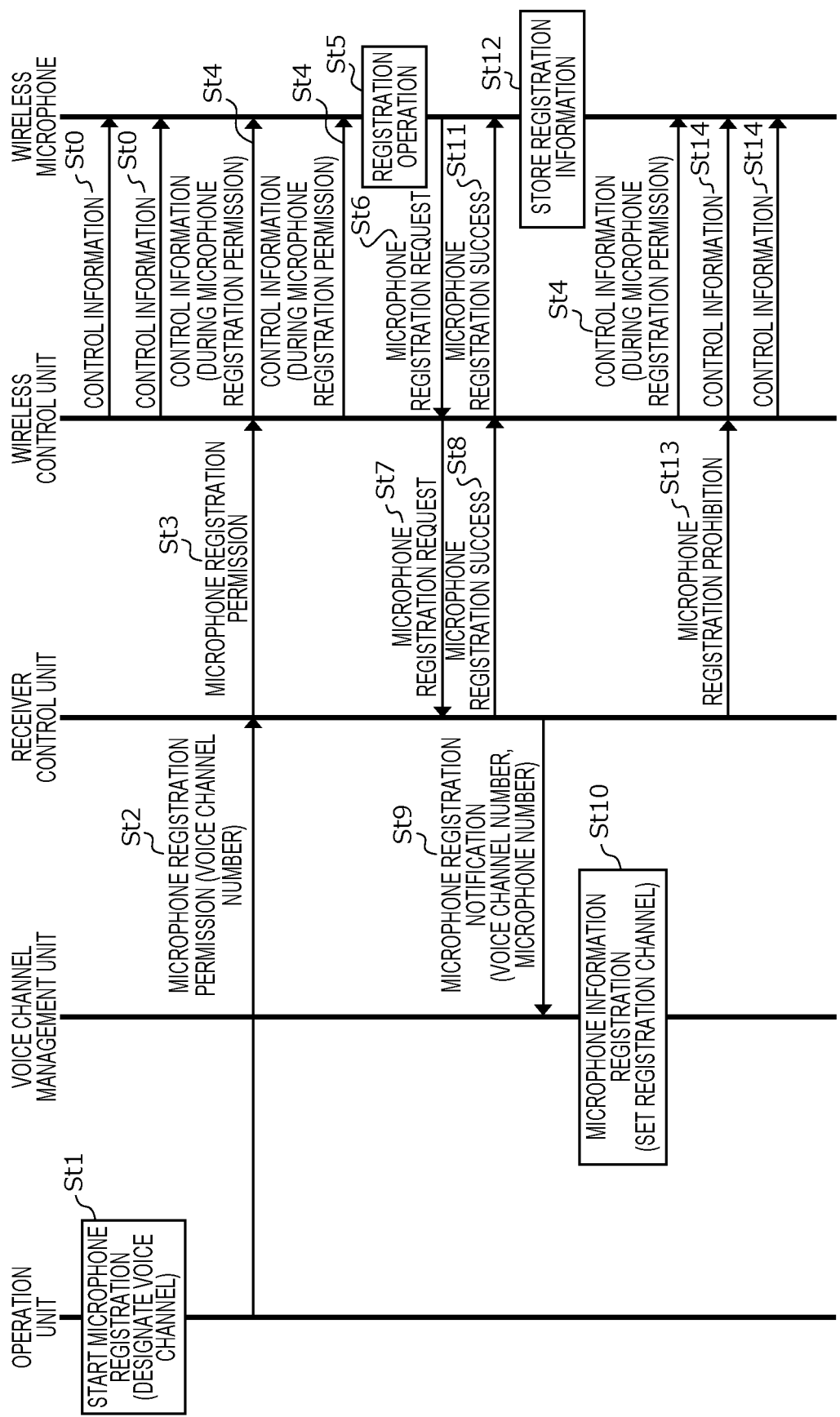
FIG. 5 is a sequence diagram illustrating an example of an operation procedure at the time of registering a wireless microphone by the wireless microphone system.

Next, various examples of an operation procedure of the wireless microphone system according to the present embodiment will be described with reference to FIGS. 5 to 9. FIG. 5 is a sequence diagram illustrating an example of an operation procedure at the time of registering the wireless microphone 20 by the wireless microphone system 1.

In FIG. 5, each of the wireless control units 121 to 12$k$ of the receiver 10 periodically transmits the control signal (control information) related to the wireless communication to each of the plurality of wireless microphones 20 (step St0). An operation (operation of starting microphone registration) of registering the wireless microphone 20 is input to the operation unit IN1 by a person (for example, the operator of the wireless microphone system 1) who operates the receiver 10 (Step St1). In this operation, for example, the microphone number of the wireless microphone 20 to be registered and the voice channel number are input (designated). The operation unit IN1 generates an instruction for microphone registration permission including the microphone number and the voice channel number input in step St1, and sends the instruction to the receiver control unit 11 (step St2).

When the receiver control unit 11 acquires the instruction for the microphone registration permission from the operation unit IN1 in step St2, the receiver control unit 11 sends, to the wireless control unit (for example, the wireless control unit 121), an instruction for transmitting the instruction for the microphone registration permission to the wireless microphone 20 (step St3). The wireless control unit (for example, the wireless control unit 121) transmits the instruction for the microphone registration permission to the wireless microphone 20 via the corresponding wireless unit and transmission and reception antenna (step St4). This instruction is the control information indicating a status that the microphone registration is currently permitted.

When the wireless microphones 20 detects a registration operation to the operation unit IN3 after receiving the instruction (control information) from the receiver 10 in step St4 (step St5), the wireless microphone 20 generates a microphone registration request and transmits the microphone registration request to the receiver 10 (step St6). The wireless control unit of the receiver 10 sends, to the receiver control unit 11, the microphone registration request transmitted in step St6 (step St7).

When the receiver control unit 11 acquires the microphone registration request sent in step St7, the receiver control unit 11 permits registration of the corresponding wireless microphone 20, generates a notification of microphone registration success to that effect, and sends, to the wireless control unit (for example, the wireless control unit 121), an instruction for transmitting the notification of the microphone registration success (step St8). Here, in order to simplify the description, it is assumed that the registration of the wireless microphone which is the target of the microphone registration request is successful (that is, assignment of the registration channel to the microphone number is not performed on the voice channel matrix MTX1). In response to the permission of the registration of the wireless microphone 20, the receiver control unit 11 sends, to the voice channel management unit 14, the notification of the microphone registration success (microphone registration notification) (step St9). This notification includes the microphone number and the voice channel number input (designated) in step St1. Based on the notification in step St9, the voice channel management unit 14 additionally sets (updates) a use relationship between the corresponding microphone number and voice channel number in the voice channel matrix MTX1 (step St10). Accordingly, the receiver 10 can complete setting of the registration channel of the microphone number input (designated) in step St1, and can audibly output, via the voice channel corresponding to the registered voice channel number, the voice signal transmitted from the wireless microphone 20 corresponding to the microphone number.

The wireless control unit (for example, the wireless control unit 121) transmits the notification of microphone registration success to the corresponding wireless microphone 20 via the corresponding wireless unit and the transmission and reception antenna (step St11). When the corresponding wireless microphone 20 receives the notification of the microphone registration success transmitted in step St11, the corresponding wireless microphone 20 stores the registration information (specifically, the microphone number and the voice channel number that is registered in a usable manner) in the memory 25, the storage unit 26, or the like (step St12).

In response to generation of the notification of the microphone registration success in step St8, the receiver control unit 11 generates a notification of microphone registration prohibition (that is, a notification that another voice channel number is not newly registered as a registration channel for the wireless microphone 20 of the microphone number) and sends, to the wireless control unit (for example, the wireless control unit 121), an instruction for transmitting the notification of the microphone registration prohibition (step St13). The wireless control unit (for example, the wireless control unit 121) transmits a microphone registration prohibition notification (control information) to the corresponding wireless microphone 20 via the corresponding wireless unit and the transmission and reception antenna (step St14).

Figure 6:
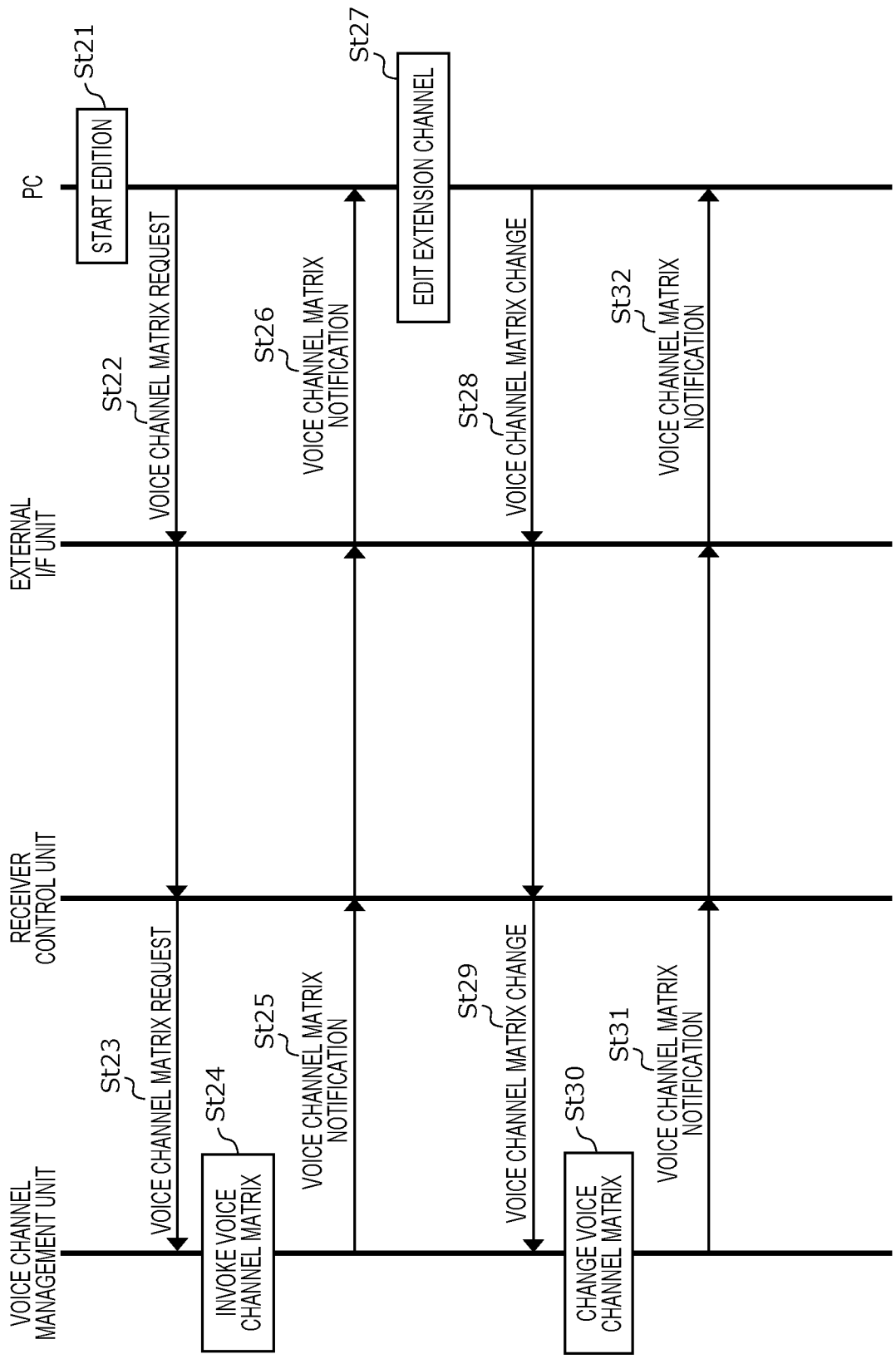
FIG. 6 is a sequence diagram illustrating an example of an operation procedure at the time of editing an extension channel by the wireless microphone system.

FIG. 6 is a sequence diagram illustrating an example of an operation procedure at the time of editing the extension channel by the wireless microphone system 1.

In FIG. 6, an operation of starting editing of the voice channel matrix MTX1 is input to the operation unit IN3 by the person (for example, the operator of the wireless microphone system 1 or the user) who operates the PC 30 (step St21). Based on the operation in step St21, the PC 30 generates a request for the voice channel matrix MTX1 and sends the request to the external interface unit 18 (step St22). The request for the voice channel matrix MTX1 received by the external interface unit 18 is sent to the receiver control unit 11 of the receiver 10. The receiver control unit 11 sends, to the voice channel management unit 14, the request for the voice channel matrix MTX1 sent in step St22 (step St23).

The voice channel management unit 14 invokes and acquires data of the voice channel matrix MTX1 stored in the memory 15 (step St24), and notifies the receiver control unit 11 of the data (step St25). The receiver control unit 11 sends the data of the voice channel matrix MTX1 to the PC 30 via the external interface unit 18 (step St26).

Here, an operation of editing the voice channel matrix MTX1 (for example, editing the extension channel) is input to the operation unit IN3 by the person (for example, the operator of the wireless microphone system 1 or the user) who operates the PC 30 (step St27). Based on the operation in step St27, the PC 30 generates a request for changing the voice channel matrix MTX1 and sends the request to the external interface unit 18 (step St28). The request for changing the voice channel matrix MTX1 received by the external interface unit 18 is sent to the receiver control unit 11 of the receiver 10. The receiver control unit 11 sends, to the voice channel management unit 14, the request for changing the voice channel matrix MTX1 sent in step St28 (step St29).

The voice channel management unit 14 changes a corresponding portion of the voice channel matrix MTX1 based on the change request sent in step St29 (step St30), generates a notification that the voice channel matrix MTX1 has been changed, and notifies the receiver control unit 11 of the notification (step St31). The receiver control unit 11 sends, to the PC 30, the data of the voice channel matrix MTX1 after the change via the external interface unit 18 (step St32).

Figure 7:
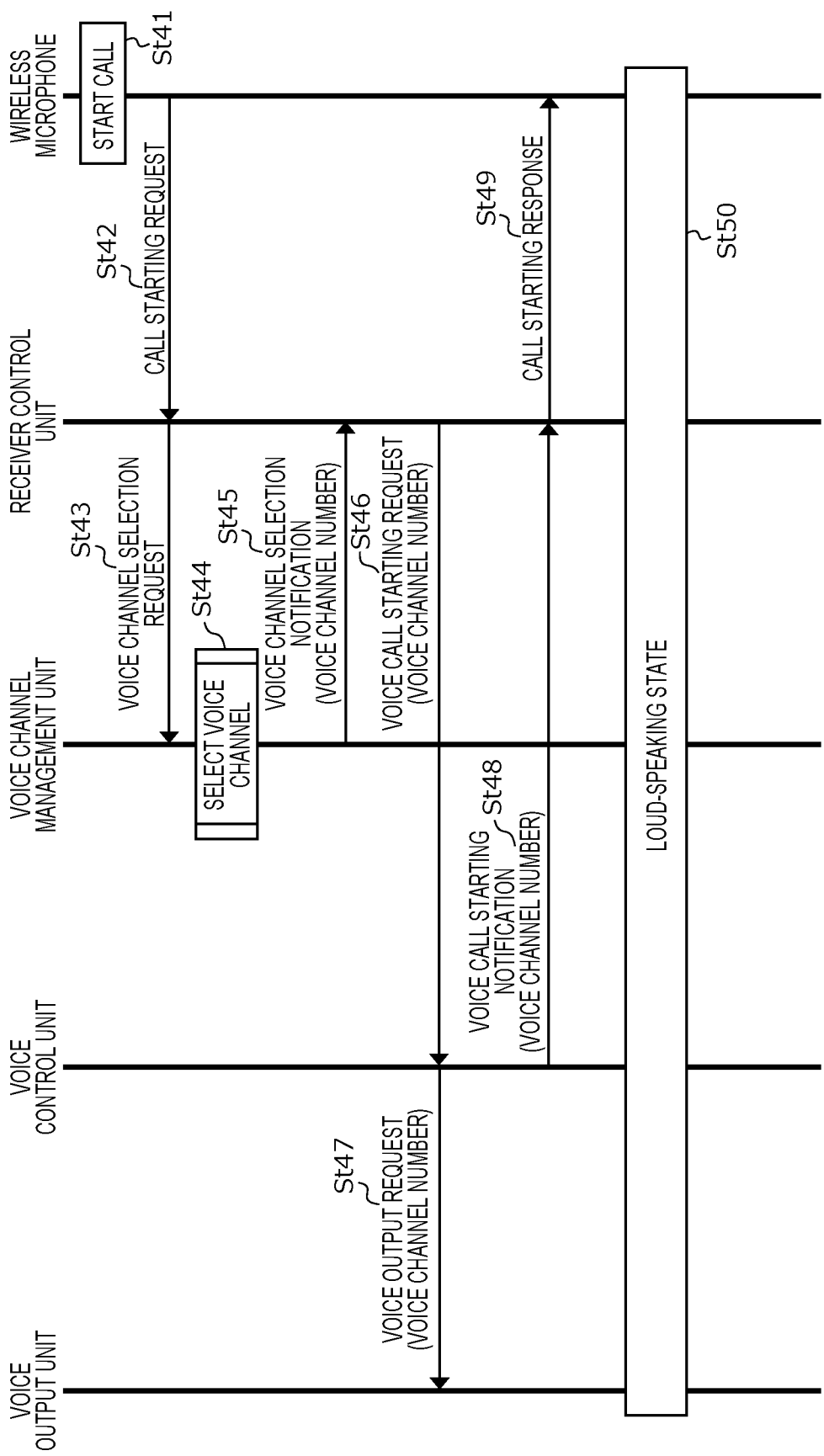
FIG. 7 is a sequence diagram illustrating an example of an operation procedure at the time of starting a call of the wireless microphone by the wireless microphone system.
Figure 8:
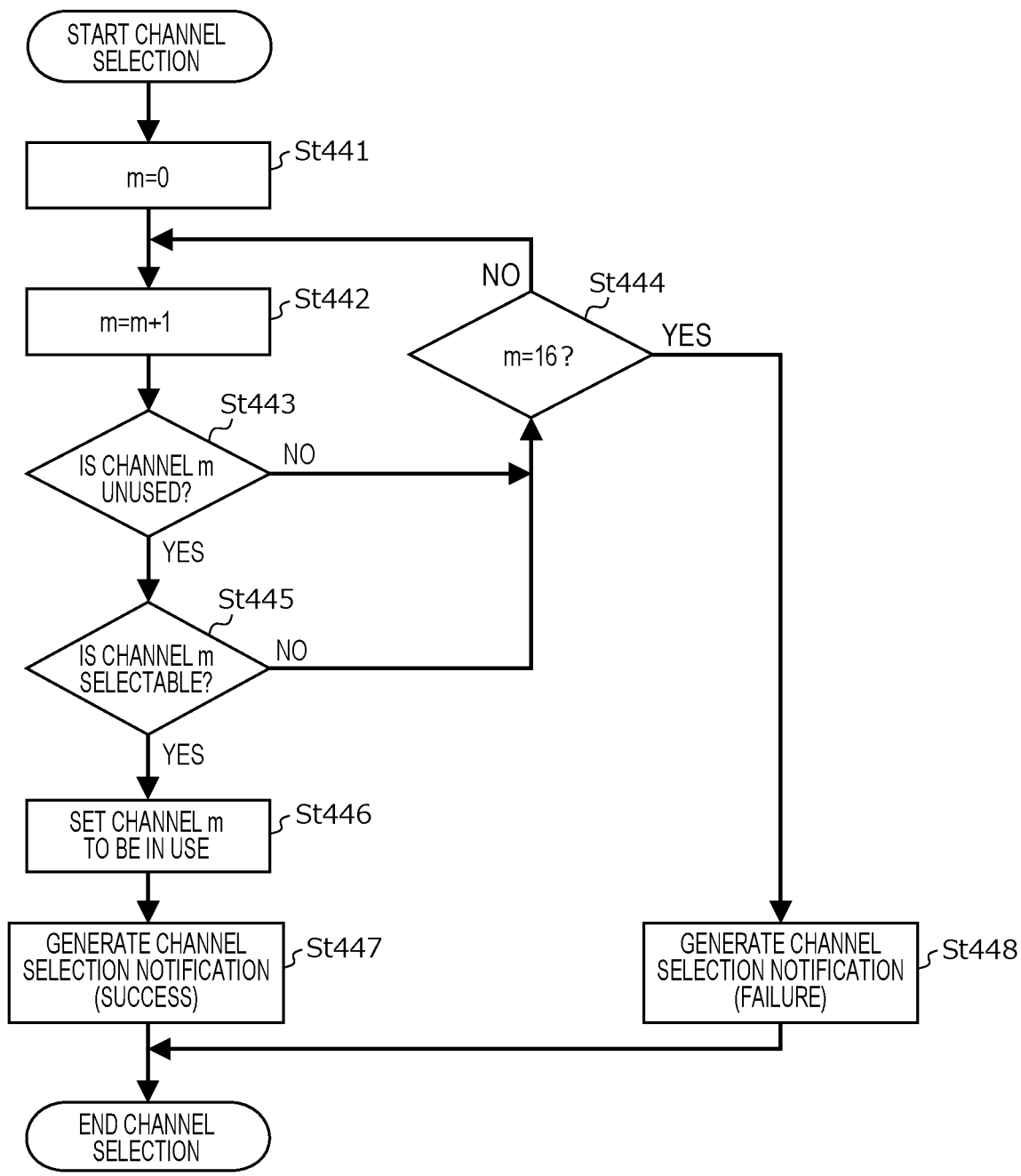
FIG. 8 is a flowchart illustrating an example of an operation procedure at the time of selecting a voice channel by a voice channel management unit.

FIG. 7 is a sequence diagram illustrating an example of an operation procedure at the time of starting a call of the wireless microphones 20 by the wireless microphone system 1. FIG. 8 is a flowchart illustrating an example of an operation procedure at the time of selecting the voice channel by the voice channel management unit 14. The flowchart in FIG. 8 is an example of a subroutine of step St44 in FIG. 7. As a premise of the description in FIG. 7, the microphone registration processing has been completed for the wireless microphone 20 according to a sequence in FIG. 5.

In FIG. 7, when the person (for example, the participant of the conference) who is the user presses a call starting button (step St41), the wireless microphone 20 generates a call starting request and sends the call starting request to the receiver 10 (step St42). When the receiver control unit 11 of the receiver 10 receives the call starting request sent in step St42, the receiver control unit 11 generates a voice channel selection request for requesting selection of the voice channel number corresponding to the microphone number of the wireless microphone which is the transmission source, and sends the voice channel selection request to the voice channel management unit 14 (step St43). The voice channel management unit 14 selects the voice channel number based on the voice channel selection request sent in step St43 (step St44). Details of the processing of step St44 will be described later with reference to FIG. 8.

When the selection of the voice channel number is successful (see FIG. 8), the voice channel management unit 14 generates a voice channel selection notification indicating the selected voice channel number and sends the voice channel selection notification to the receiver control unit 11 (step St45). The receiver control unit 11 generates a voice call starting request for starting the voice output of the voice signal from the wireless microphone 20 of the corresponding microphone number based on the voice channel selection notification sent in step St45, and sends the voice call starting request to the voice control unit 16 (step St46). The voice control unit 16 selects the voice output unit corresponding to the corresponding voice channel based on the voice call starting request sent in step St46, generates a voice output request for audibly outputting the voice signal, and sends the voice output request to the voice output unit (step St47). The voice control unit 16 generates a voice call starting notification that the voice output of the voice signal from the wireless microphone 20 of the corresponding microphone number is successfully started by the voice output unit, and sends the voice call starting notification to the receiver control unit 11 (step St48). Based on the voice call starting notification sent in step St48, the receiver control unit 11 generates a call starting response indicating that the processing for the call starting request in step St42 has been executed, and transmits the call starting response to the wireless microphones 20 that is the transmission source of the call starting request (step St49). Accordingly, the voice signal transmitted from the wireless microphone 20 is received by the receiver 10, and the voice signal is audibly output from the voice channel of the voice channel number corresponding to the microphone number of the wireless microphone 20 and enters a loud-speaking state (step St50).

In FIG. 8, the voice channel management unit 14 sets a variable m=0 (step St441), and increments the variable m (step St442). The voice channel management unit 14 determines whether the current variable m (that is, the variable m indicating the voice channel number) is unused based on the voice channel matrix MTX1 (step St443). When the voice channel management unit 14 determines that the current variable m (that is, the variable m indicating the voice channel number) is not unused (that is, is in use) (NO in step St443), the voice channel management unit 14 determines whether the current variable m is 16 which is a maximum value (step St444). When the voice channel management unit 14 determines the current variable m is 16 which is the maximum value (YES in step St444), the voice channel management unit 14 generates a channel selection notification (failure) that an unused voice channel has failed (step St448).

On the other hand, when the voice channel management unit 14 determines that the current variable m is not 16 which is the maximum value (NO in step St444), the processing of the voice channel management unit 14 returns to step St442.

When the voice channel management unit 14 determines that the current variable m (that is, the variable m indicating the voice channel number) is not used (YES in step St443), the voice channel management unit 14 determines, based on the voice channel matrix MTX1, whether the voice channel of the voice channel number is selectable (step St445). This can be determined based on, for example, whether the corresponding voice channel number is in use (for example, during a call). When the voice channel management unit 14 determines that the voice channel of the unused voice channel number is not selectable (NO in step St445), the processing of the voice channel management unit 14 returns to step St444.

On the other hand, when the voice channel management unit 14 determines that the voice channel of the unused voice channel number is selectable (YES in step St445), the voice channel management unit 14 sets the corresponding voice channel number in the voice channel matrix MTX1 to be in use (step St446). Accordingly, the voice channel management unit 14 generates the channel selection notification (success) that the selection of the unused voice channel has succeeded (step St447).

Figure 9:
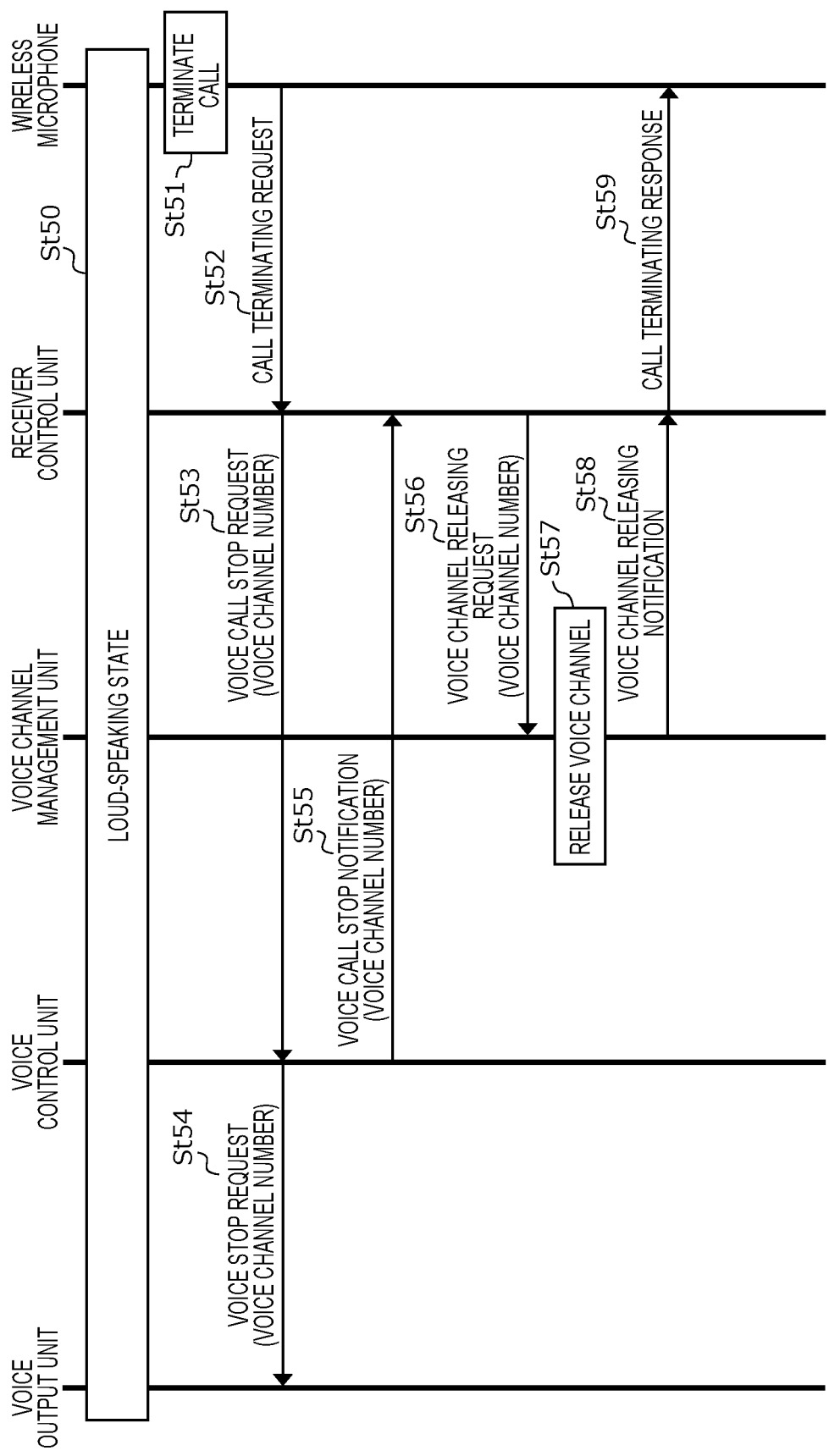
FIG. 9 is a sequence diagram illustrating an example of an operation procedure at the time of terminating the call of the wireless microphone by the wireless microphone system.

FIG. 9 is a sequence diagram illustrating an example of an operation procedure at the time of terminating the call of the wireless microphones 20 by the wireless microphone system 1. As a premise of a description of FIG. 9, the wireless microphone 20 is in a call state (loud-speaking state) according to the sequence in FIG. 7 (step St50).

In FIG. 9, when the person (for example, the participant of the conference) who is the user presses a call terminating button (step St51), the wireless microphone 20 generates a call terminating request and sends the call terminating request to the receiver 10 (step St52). When the receiver control unit 11 of the receiver 10 receives the call terminating request sent in step St52, the receiver control unit 11 generates a voice call stop request for requesting a stop of the voice output of the voice signal via the voice channel corresponding to the microphone number of the wireless microphone 20 which is the transmission source, and sends the voice call stop request to the voice control unit 16 (step St53). The voice call stop request includes the voice channel number corresponding to the microphone number of the wireless microphone that is currently in a call. Based on the voice call stop request sent in step St53, the voice control unit 16 instructs the corresponding voice output unit to stop the voice output of the voice signal via the voice channel of the corresponding voice channel number (step St54).

After instructing to stop the voice output of the voice signal in step St54, the voice control unit 16 generates a notification (voice call stop notification) that the voice output of the voice signal via the voice channel of the corresponding voice channel number is stopped, and sends the notification to the receiver control unit 11 (step St55). The receiver control unit 11 instructs the voice channel management unit 14 to release the voice channel corresponding to the corresponding microphone number based on the voice call stop notification sent in step St55 (step St56). The voice channel management unit 14 performs processing of releasing the corresponding voice channel number in the voice channel matrix MTX1 to an unused state based on the instruction in step St56 (step St57). After executing the release processing of the voice channel number, the voice channel management unit 14 generates a voice channel release notification that the release processing of the corresponding voice channel number has ended, and sends the voice channel release notification to the receiver control unit 11 (step St58). Based on the voice channel release notification sent in step St58, the receiver control unit 11 generates a call termination response that the processing for the call terminating request in step St52 has been executed, and transmits the call termination response to the wireless microphone that is the transmission source of the call terminating request (step St59). Accordingly, the voice output of the voice signal transmitted from the wireless microphone 20 in the receiver 10 is stopped.

Accordingly, the wireless microphone system 1 according to the present embodiment includes the input device (for example, the PC 30) and the receiver 10 capable of wirelessly communicating with each of the plurality of wireless microphones 20 capable of collecting the voice of the speaking person and wirelessly transmitting the voice signal of the voice, receives the voice signal transmitted from the wireless microphone 20, and audibly outputs the voice signal by using any one of the plurality of voice channels. The receiver 10 holds voice channel management data (for example, the voice channel matrix MTX1) which is generated based on the input from the input device and defines the use relationship between the plurality of voice channels and the plurality of wireless microphones 20, and audibly outputs, based on the voice channel management data, the voice signal of the speaking person sent from the wireless microphone 20. Accordingly, the wireless microphone system 1 can flexibly set an opportunity for the participant (speaking person) of the conference and the like to make a speech based on the voice channel matrix MTX1 generated based on the input from the PC 30, and can improve convenience.

The receiver 10 further includes n voice output units (for example, the pair of the voice output unit 171 and the speaker SP1, the pair of the voice output unit 172 and the speaker SP2, ..., and the pair of the voice output unit 17$n$ and the speaker SPn) that match the number n (n is the predetermined integer of 2 or more) of the plurality of voice channels. Accordingly, the receiver 10 can receive the voice signal from the wireless microphone 20 corresponding to each of the n voice channels and audibly output the voice signal by using up to the n voice output units.

The voice channel management data (for example, the voice channel matrix MTX1) is configured such that the use relationship between the plurality of voice channels and the plurality of wireless microphones 20 is editable based on the input from the input device (for example, the PC 30). Accordingly, the wireless microphone system 1 can easily generate the voice channel matrix MTX1 by the PC 30 alone or the combination of the PC 30 and the receiver 10, and can easily edit a part or all of the contents thereof.

The voice channel management data (for example, the voice channel matrix MTX1) assigns one or more usable voice channels among the plurality of voice channels to one wireless microphone 20. For example, the voice channel number Ch1 is assigned corresponding to the microphone number Mc1, and the voice channel numbers Ch5 to Ch12 are assigned to the microphone number Mc5. Accordingly, the wireless microphone system 1 can freely and flexibly set one or more voice channels (that is, only one exclusive voice channel or a plurality of selectable voice channels) for one wireless microphone 20 in a usable manner.

The voice channel management data (for example, the voice channel matrix MTX1) assigns one or more unusable voice channels among the plurality of voice channels to one wireless microphone 20. For example, the voice channel numbers Ch2 to Ch16 are assigned to the microphone number Mc1, and the voice channel numbers Ch1 to Ch4 and Ch13 to Ch16 are assigned to the microphone number Mc5. Accordingly, since the wireless microphone system 1 can set one or more unusable voice channels for one wireless microphone 20, unnecessary assignment of the voice channels to the wireless microphone 20 can be prevented.

The voice channel management data (for example, the voice channel matrix MTX1) assigns the same plurality of voice channels (for example, each of the voice channels of the voice channel numbers Ch5 to Ch12) to a plurality of wireless microphones 20 (for example, each of the wireless microphones 20 of the microphone numbers Mc5 to MC10) which are a part of the plurality of wireless microphones 20 in a usable manner. Accordingly, in a scene in which there is a possibility that anyone of a team including a plurality of persons can speak in the conference or the like, the wireless microphone system 1 can perform the voice output via a voice channel in a free state among the plurality of voice channels even when the speaking person makes a speech using any one of a plurality of wireless microphones 20 which is a part of the plurality of wireless microphones 20, can give equal opportunities to speak, and can develop operations such as conference management with excellent flexibility.

When the receiver 10 receives the call starting request from any one of the plurality of wireless microphones 20, the receiver 10 selects a usable voice channel corresponding to the any one wireless microphone 20 among the plurality of voice channels based on the voice channel management data (for example, the voice channel matrix MTX1), and audibly outputs, via the selected voice channel, the voice signal of the speaking person sent from the any one wireless microphone 20. Accordingly, the receiver 10 can appropriately audibly output, via the voice channel corresponding to the microphone number for which the registration channel or the registration channel and the extension channels are registered (set) in the voice channel matrix MTX1, the voice signal sent from the wireless microphone 20 of the microphone number.

When the receiver 10 receives the call terminating request from one of the plurality of wireless microphones 20 in a call, the receiver 10 releases the voice channel that is being used for the wireless microphone 20 in a call and updates the voice channel management data (for example, the voice channel matrix MTX1). Accordingly, the receiver 10 releases the voice channels corresponding to the microphone number of the wireless microphone 20 that has requested the termination of the call and updates the voice channel matrix MTX1, whereby the receiver 10 can newly register (set) the microphone number of the wireless microphone 20 that issues a registration request for the voice channel that has been released.

The receiver 10 can switch the operation mode to the normal mode or a specific mode (for example, the conference mode) when the predetermined conditions are satisfied. Here, the predetermined conditions correspond to, for example, a condition that a request for changing the operation mode to the conference mode is received from the PC 30, a predetermined time period (for example, 15 minutes from 30 minutes before the conference to 15 minutes before the conference which is set in advance), and the time when the wireless microphone 20 to be used in the conference or the like is newly registered (see FIG. 5), but the predetermined conditions are not limited to thereto. In the normal mode, the receiver 10 assigns the only one usable voice channel among the plurality of voice channels to one wireless microphone 20. In the specific mode, the receiver 10 assigns one or more usable voice channels among the plurality of voice channels to one wireless microphone 20.

The receiver 10 according to the present embodiment includes a wireless communication unit (for example, the wireless unit 131 to which the transmission and reception antenna Ant11 and the transmission and reception antenna Ant21 are connected, the wireless unit 132 to which the transmission and reception antenna Ant12 and the transmission and reception antenna Ant22 are connected, ..., and the wireless unit 13$k$ to which the transmission and reception antenna Ant1$k$ and the transmission and reception antenna Ant2$k$ are connected) that wirelessly communicates with each of the plurality of wireless microphones 20 capable of collecting the voice of the speaking person and wirelessly transmitting the voice signal of the voice, the voice output unit (for example, the pair of the voice output unit 171 and the speaker SP1, the pair of the voice output unit 172 and the speaker SP2, ..., and the pair of the voice output unit 17$n$ and the speaker SPn) that audibly outputs the voice signal received from the wireless microphone 20 by using any one of the plurality of voice channels, and a channel control unit (for example, the voice channel management unit 14) that holds the voice channel management data (for example, the voice channel matrix MTX1) that is generated based on the input from the input device (for example, the PC 30) and defines the use relationship between the plurality of voice channels and the plurality of wireless microphones 20, and controls, based on the voice channel management data, the voice output of the voice signal of the speaking person sent from the wireless microphone 20. Accordingly, the receiver 10 can flexibly set the opportunity for the participant (speaking person) of the conference and the like to make a speech based on the voice channel matrix MTX1 generated based on the input from the PC 30, and can improve the convenience.

Although the embodiment has been described with reference to the accompanying drawings, the present disclosure is not limited to such an example. It will be apparent to those skilled in the art that various changes, modifications, substitutions, additions, deletions, and equivalents can be conceived within the scope of the claims, and it should be understood that such changes and the like also belong to the technical scope of the present disclosure. The constituent elements in the above-described embodiment may be combined as desired without departing from the scope of the invention.

The present disclosure is useful as a wireless microphone system, a receiver, and a voice output method that flexibly set an opportunity for a participant to make a speech and improve convenience.

What is claimed is:

1. A wireless microphone system comprising:
   an input device; and
   a receiver comprising an operation unit, a processor, and a memory storing instructions that, when executed by the processor, cause the receiver to perform operations, the operations comprising:
   wirelessly communicating with a plurality of wireless microphones;
   receiving a voice signal of a speaking person transmitted from a corresponding wireless microphone of the plurality of wireless microphones;
   receiving, via the operation unit, a user designation of a microphone number to be registered and a corresponding voice channel number, to register the plurality of wireless microphones in association with a plurality of voice channels to generate voice channel management data defining a first group of first wireless microphones, wherein each first wireless microphone is exclusively registered to a corresponding first voice channel, and a second group of N number of second wireless microphones, wherein the N number of second wireless microphones are registered to O number of second voice channels where O is less than N;
   performing a microphone selection process to start a call using one of the N number of second wireless microphones including:
      determining that a voice channel number m out of the O number of second voice channels has entered a loud-speaking state,
      incrementing the voice channel number m to m+1,
      determining that the voice channel number m+1 has not entered a loud-speaking state, and
      selecting the voice channel number m+1; and
   audibly outputting the voice signal of the speaking person sent from the corresponding wireless microphone by using, based on the voice channel management data, the exclusively registered first voice channel in case the corresponding wireless microphone is the first wireless microphone in the first group, or one of the O number of second voice channels in case the corresponding wireless microphones is the second wireless microphone in the second group.

2. The wireless microphone system according to claim 1, wherein a number of the plurality of voice channels is n, where n is an integer of 2 or more, and
   wherein the receiver further comprises voice output units, a number of the voice output units being n that is equal to the number of the plurality of voice channels.

3. The wireless microphone system according to claim 1, wherein the voice channel management data is configured such that the use relationship between the plurality of voice channels and the plurality of wireless microphones is editable based on the input from the input device.

4. The wireless microphone system according to claim 1, wherein the voice channel management data registers one or more unusable voice channels of the plurality of voice channels to one of the plurality of wireless microphones.

5. The wireless microphone system according to claim 1, wherein all of the O number of second voice channels are usable by each of the N number of second wireless microphones.

6. The wireless microphone system according to claim 1, wherein the operations further comprise:
   selecting, in response to receiving a call starting request from the corresponding wireless microphone, a usable voice channel based on the voice channel management data.

7. The wireless microphone system according to claim 6, wherein the operations further comprise:
   releasing, in response to receiving a call terminating request from the corresponding wireless microphone, the usable voice channel that is being used for the corresponding wireless microphone; and
   updating the voice channel management data.

8. The wireless microphone system according to claim 1, wherein the operations further comprise:
   switching an operation mode to a normal mode or a specific mode in response to a defined condition being satisfied;
   in the normal mode, selecting only one usable voice channel of the plurality of voice channels to one of the plurality of wireless microphones; and
   in the specific mode, selecting one or more usable voice channels of the plurality of voice channels to one of the plurality of wireless microphones.

9. The wireless microphone system according to claim 1, wherein, in the registration of one of the N number of second wireless microphones,
   the voice channel number m is a registration channel specified for said one of the N number of second wireless microphones, and
   the voice channel number m+1 is an extension channel additionally registered for said one second wireless microphone.

10. The wireless microphone system according to claim 1, wherein the input device comprises a personal computer, and the operation unit comprises a registration button operable by a user.

11. A receiver comprising:
    a wireless communication device;
    a voice output device;
    an operation unit;

a processor; and a memory storing instructions that, when executed by the processor, cause the receiver to perform operations, the operations comprising:

causing the wireless communication device to wirelessly communicate with a plurality of wireless microphones;

causing the voice output device to audibly output a voice signal of a speaking person received from a corresponding wireless microphone of the plurality of wireless microphones by using one of a plurality of voice channels; and receiving, via the operation unit, a user designation of a microphone number to be registered and a corresponding voice channel number, to register the plurality of wireless microphones in association with the plurality of voice channels to generate voice channel management data defining a first group of first wireless microphones, wherein each first wireless microphone is exclusively registered to a corresponding first voice channel, and a second group of N number of second wireless microphones, wherein the N number of second wireless microphones are registered to O number of second voice channels where O is less than N;

performing a microphone selection process to start a call using one of the N number of second wireless microphones, including determining that a voice channel number m out of the O number of second voice channels has entered a loud-speaking state, incrementing the voice channel number m to m+1, determining that the voice channel number m+1 has not entered a loud-speaking state, and selecting the voice channel number m+1; and controlling, based on the voice channel management data, voice output of the voice signal of the speaking person sent from the corresponding wireless microphone.

12. The receiver according to claim 11, wherein, in the registration of one of the N number of second wireless microphones, the voice channel number m is a registration channel specified for said one of the N number of second wireless microphones, and the voice channel number m+1 is an extension channel additionally registered for said one second wireless microphone.

13. The receiver according to claim 11, wherein the operation unit comprises a registration button operable by a user.

14. A voice output method performed by a wireless microphone system, the wireless microphone system comprising at least an input device and a receiver, the voice output method comprising:

wirelessly communicating with a plurality of wireless microphones;

receiving, via an operation unit, a user designation of a microphone number to be registered and a corresponding voice channel number, to register the plurality of wireless microphones in association with a plurality of voice channels to generate voice channel management data defining a first group of first wireless microphones, wherein each first wireless microphone is exclusively registered to a corresponding first voice channel, and a second group of N number of second wireless microphones, wherein the N number of second wireless microphones are registered to O number of second voice channels where O is less than N;

performing a microphone selection process to start a call using one of the N number of second wireless microphones, including determining that a voice channel number m out of the O number of second voice channels has entered a loud-speaking state, incrementing the voice channel number m to m+1, determining that the voice channel number m+1 has not entered a loud-speaking state, and selecting the voice channel number m+1;

receiving a voice signal of a speaking person transmitted from a corresponding wireless microphone of the plurality of wireless microphones; and audibly outputting the voice signal of the speaking person transmitted from the corresponding wireless microphone by using, based on the voice channel management data, the exclusively registered first voice channel in case the corresponding wireless microphone is the first wireless microphone in the first group, or one of the O number of second voice channels in case the corresponding wireless microphone is the second wireless microphone in the second group.

15. The voice output method according to claim 14, comprising:

editing the voice channel management data based on input from the input device.

16. The voice output method according to claim 14, wherein the voice channel management data registers one or more unusable voice channels of the plurality of voice channels to one of the plurality wireless microphones.

17. The voice output method according to claim 14, wherein all of the O number of second voice channels are usable by each of the N number of second wireless microphones.

18. The voice output method according to claim 14, comprising:

switching an operation mode to a normal mode or a specific mode in response to a defined condition being satisfied;

in the normal mode, selecting only one usable voice channel of the plurality of voice channels to one of the plurality of wireless microphones; and in the specific mode, selecting one or more usable voice channels of the plurality of voice channels to one of the plurality of wireless microphones.

19. The voice output method according to claim 14, wherein, in the registration of one of the N number of second wireless microphones, the voice channel number m is a registration channel specified for said one of the N number of second wireless microphones, and the voice channel number m+1 is an extension channel additionally designated registered for said one second wireless microphone.

20. The voice output method according to claim 14, wherein the input device comprises a personal computer, and the operation unit comprises a registration button operable by a user.

* * * * *